(No Model.)
E. J. O'BRIEN & D. J. O'KEEFE.
Cotton Seed Linter.
No. 240,170.           Patented April 12, 1881.
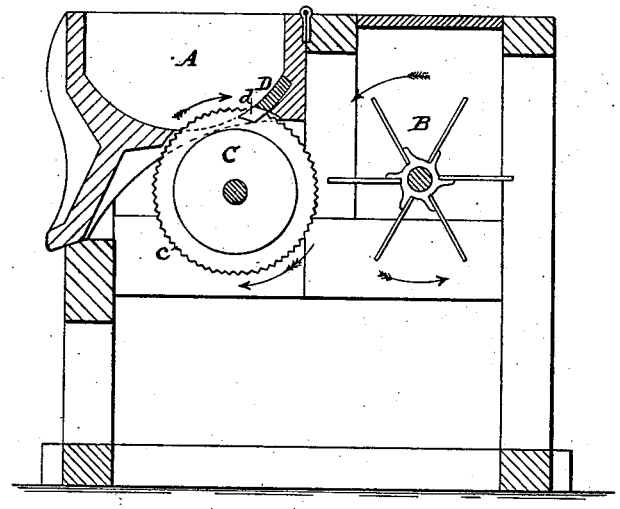
ATTEST:
Alex U. Hoig
C. W. Beehler
INVENTORS:
Edward J. O'Brien
Dennis J. O'Keefe
per Robt Burns
atty.

UNITED STATES PATENT OFFICE.

EDWARD J. O'BRIEN AND DENNIS J. O'KEEFE, OF ST. LOUIS, MISSOURI.

COTTON-SEED LINTER.

SPECIFICATION forming part of Letters Patent No. 240,170, dated April 12, 1881.

Application filed February 19, 1881. (No model.)

*To all whom it may concern:*

Be it known that we, EDWARD J. O'BRIEN and DENNIS J. O'KEEFE, citizens of the United States, residing at St. Louis, in the State of Missouri, have invented certain new and useful Improvements in Cotton-Seed Linters; and we do hereby declare that the following is a full, clear, and exact description of the same, reference being had to the accompanying drawings, forming a part of this specification.

Heretofore cotton-seed linters have had their saws formed in the same manner as the ordinary cotton-gin saw—namely, with sharp needle-pointed teeth, and with the saws separated by separate ribs, so as to form a large space between the saws which filled up with the unginned cotton-seed. With this construction, owing to the short fiber of the lint, the thorough removal of the same was rendered a very difficult and lengthy operation.

To overcome these difficulties and to greatly increase the linting capacity of the machine is the object of the present invention, which consists, first, in forming the teeth of the saw-blades with a wide face, which teeth are preferably beveled or filed so that their points will occur alternately at the opposite sides of the blade, the teeth being afterward alternately "set," so as to overhang the sides of the blade, this construction furnishing a broad or wide point to the teeth, which has then a rasping or rubbing action, which we find by practical experiment is the proper action required for the thorough and perfect removal of the lint from the seed without injury to the hull; second, in the construction of a comb-piece or abutment as a substitute for the ribs heretofore in use, which is so formed as to allow of the saws being placed at but a slight distance apart, so that the cotton-seed will lie on the top of the saws, and not between them, as in the ordinary linters.

In the drawings, Figure 1 is a vertical section of a cotton-seed linter having our improvement applied thereto. Figs. 2 and 3 are detail perspective views of the improved saw-blades. Fig. 4 is a vertical section of the same.

The linter, as usual, consists of the hopper A for containing the cotton-seed to be linted, through the bottom of which the saw-blades C pass, so that their teeth will act upon the seed to remove the lint therefrom.

B is a fan for removing the lint from the saw-teeth.

The present invention relates, first, to the formation of the saw-teeth $c$, which are made the width of the saw-blade, and preferably of a triangular shape, as indicated in Fig. 2. In use we find it preferable to file the teeth obliquely in opposite directions, as indicated in Fig. 3, so that the teeth will occur at opposite sides of the blades alternately, and in this case the receding corners $c'$ of the teeth may be filed off, so as to form a shallow annular V-shaped channel, $c^2$, around the saw, as indicated in Figs. 3 and 4; and in order to increase the width of this channel the teeth are set so as to overhang the sides of the saw-blade, as shown in Fig. 4. By this construction we achieve a broad face or point to the teeth, which act upon the lint of the seed with a rubbing or rasping action, which we find by practical experiment is the only proper way of removing the lint without injury to the hull of the seed, the shallow V-shaped channel $c^2$ being to allow of more of the round surface of the seed to be operated on than could be done in case the teeth were made flat.

The invention relates, secondly, to the construction of the abutment comb piece or plate D, which is provided with teeth that project between the saw-blades, as indicated in Fig. 1. This construction permits of the saws being placed at a very slight distance apart, so that no seed can descend between them, and enables us to dispense with the use of separate ribs between the saws, as in ordinary linters, and at the same time acquire a much greater linting capacity in a given size of machine.

By our improved construction of saw-teeth, as above set forth, we are enabled to use an ordinary fan, B, in place of a brush, for removing the lint from the saw, the wear and consequent replacing of which brush is a constant item of expense in the ordinary linter. And, again, with our improved construction of linter we have been able to remove as high as seventy-five and one hundred pounds of lint from a ton of seed; whereas, with the ordinary linter it is difficult to remove more than twenty to twenty-five pounds to the ton. By removing all the lint from the seed we are enabled to ship the same on long voyages, &c., without any danger of heating, which has heretofore been a very serious difficulty met with in shipping cotton-seed with the lint on.

Having thus fully described our said invention, what we claim as new, and desire to secure by Letters Patent, is—

1. A saw for cotton-seed linters, having its teeth $c$ formed with a broad face or point, as herein described, and for the purpose set forth.

2. A saw for cotton-seed linters, having its teeth formed with a broad face or point, arranged obliquely and alternating in opposite directions, as described, and for the purpose set forth.

3. A saw for cotton-seed linters, having its teeth $c$ formed with a broad face or point, and so formed as to leave a shallow annular recess, $c^2$, around the periphery of the saw, as herein described, and for the purpose set forth.

4. In a cotton-seed linter, the abutment comb-piece D, having teeth projecting between the saw-blades, as described, and for the purpose set forth.

In testimony of said invention witness our hands at St. Louis, Missouri, this 14th day of February, 1881.

EDW. J. O'BRIEN.
DENNIS J. O'KEEFE.

In presence of—
ROBERT BURNS,
THEODORE PAPIN.